Patented Aug. 19, 1947

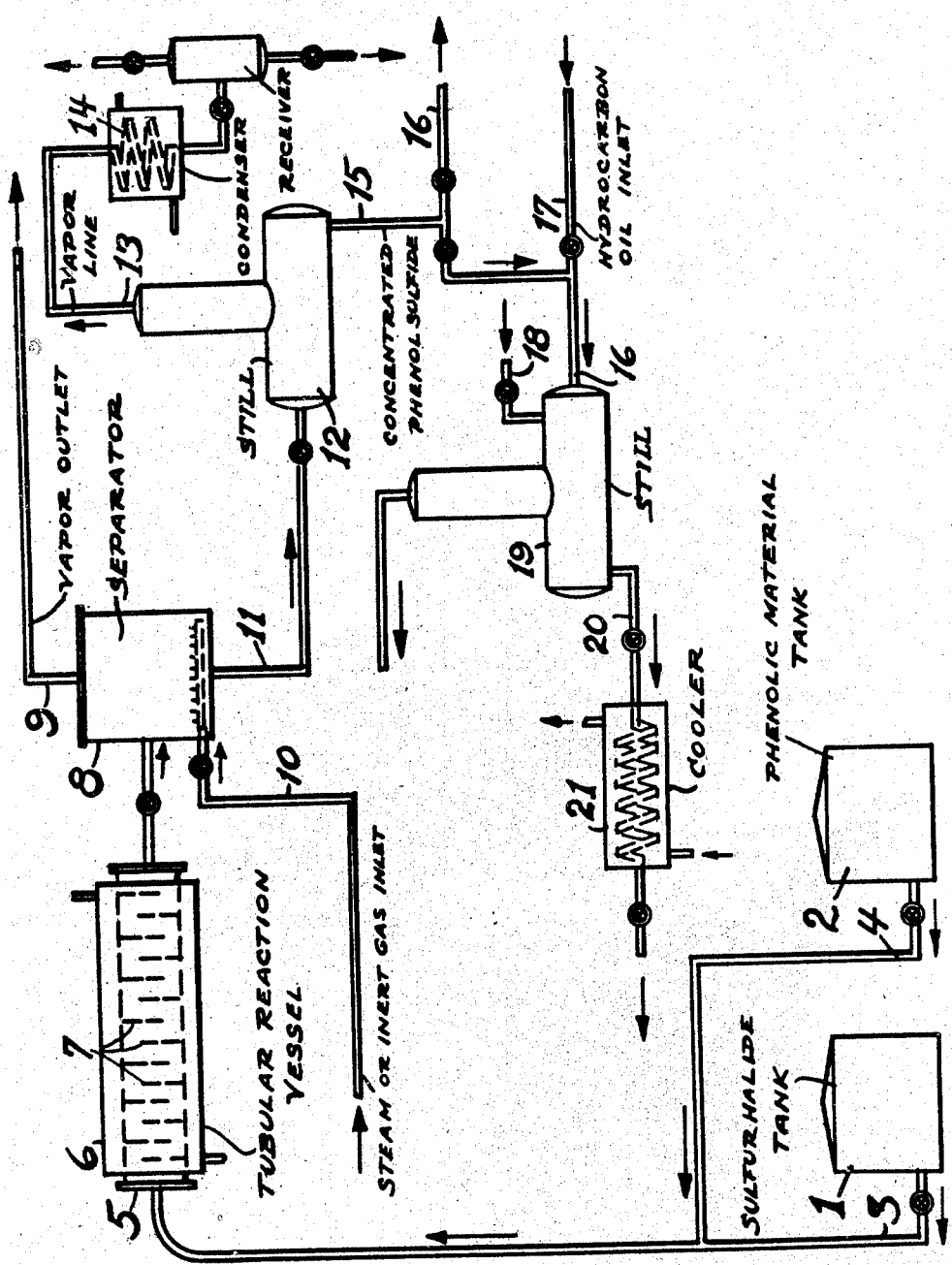

2,425,824

UNITED STATES PATENT OFFICE 2,425,824

PROCESS FOR PRODUCING PHENOLIC SULFIDES

Theodore J. Peters, Jr., Roselle, and James E. J. Kane, Elizabeth, N. J., assignors to Standard Oil Development Company, a corporation of Delaware Application December 28, 1944, Serial No. 570,187

6 Claims. (Cl. 260—608)

The present invention relates to the art of producing alkylated phenolic sulfides and derivatives thereof which are useful as addition agents to hydrocarbon lubricants, oils, waxes, greases and the like and to rubber, or rubber-like polymers because of powerful anti-corrosion and anti-oxidation properties and for other important uses. The invention will be fully understood from the following description and the drawing.

The drawing is a semi-diagrammatic view in sectional elevation of an apparatus in which the present process can be carried out and indicates the flow of material.

In preparing alkylated phenolic sulfides, disulfides and the like, either for themselves or as intermediates in the production of derivatives, the alkylated phenolic material is treated with a sulfur halide or a mixture of the halides. In practice the conversion to the sulfide or disulfide takes considerable time because of the fact that the materials are so extremely reactive that they must be added very slowly over a period of four or five hours or more so as not to excessively foam and overheat. The reaction has ordinarily been carried out in the past in rather small batches where control is more easily effected. During the reaction considerable heat is generated and hydrochloric acid vapor passes off. The reaction is probably not merely a simple linking of two of the phenolic rings through a sulfur atom or a chain of two such atoms but is accompanied by polymerization which may proceed so far as to produce definite resinification which is undesirable for the present purpose. Partial polymerization is not particularly objectionable but it is preferred to produce a uniform or reasonably homogeneous material and not one which varies in the degree or proportion of polymer from time to time and in different batches.

The product, as noted before, may be used advantageously as such in a blend with lubricating oils, greases and the like and also it may be caused to react with metal oxides or hydroxides to produce phenolates such as those of the second group of the periodic table, calcium, zinc, magnesia and other metals such as alumina and tin. These phenolates are particularly advantageous when used in lubricating oils, especially in heavy duty Diesel engines and for similar use, effecting a cleansing action, preventing deposition of carbon and varnish formation over long periods of time. This use is quite exacting and it has been found from time to time that certain materials show a troublesome sensitivity to water which results in a separation of at least part of the additive when the oil stands in the presence of water. The reason for this is not fully understood but it is believed to take place when excessive polymerization has taken place and a non-uniform product is made during the sulfurization step. In any case, it has been found by the present process that a material may be produced with extremely low water sensitivity and that it can be produced consistently and uniformly.

Referring to the drawing, numeral 1 denotes a tank from which is supplied sulfur halide either the monochloride, dichloride or a mixture of the two dissolved in a suitable solvent the nature of which will be disclosed below. Numeral 2 denotes a similar tank from which the phenolic material is also supplied either as such or in a solution in the solvent. These materials may be supplied by pipes 3 and 4 and discharged into a tubular reaction vessel or mixer 5 which is provided with a jacket 6, for cooling, and preferably fitted with interior plates or members shown generally at 7 to effect a mixing of the reactants during their flow through the reactor tube.

The product is continuously discharged into a separator 8 which is enlarged and allows the hydrochloric acid vapors to be released and to be withdrawn through a vapor pipe 9. Steam or inert gas may be added through a pipe 10 so as to assist the stripping and if desired the whole vessel 8 may be maintained under a reduced pressure by means of a vacuum pump not shown.

The product withdrawn from vessel 8 is substantially free from hydrochloric acid and flows through pipe 11 to a still 12 from which the solvent is removed by the vapor pipe 13 to a condenser 14 and concentrated phenol sulfide is removed by the pipe 15.

If this material is to be used as such, it will be drawn off at 16 but if it is to be converted to a metal phenolate, as disclosed above, it will be preferably diluted with a hydrocarbon oil supplied by line 17 and the proper metal oxide, hydroxide or the like is added at 18. These reactants are then passed to a still 19 in which the reaction takes place with an evolution of water vapor. The metal phenolate dissolved in oil is removed by pipe 20 and is cooled in the cooler 21. The apparatus described above is quite suitable for the production of phenol sulfides and their metal derivatives but other forms of apparatus can, of course, be used. For example, the ingredients may be continuously added while in solution to a vessel such as 8, shown above, in which the reaction actually takes place in addition to the evolution of hydrochloric acid. The reaction is quite rapid and in a continuous process it is found to be quite instantaneous. The important point of the process is to at all times maintain the desired narrow limits or ratios of the reactants present and while this can be gained by rapid mixing without the use of solvent, it has been found that by use of solvents the time of mixing is greatly reduced and there is an assurance of uniformity throughout the reaction vessel. The reaction itself appears to take very little time under these conditions and most of the time is consumed in insuring a complete stripping of hydrochloric acid from the product. If desired, the reaction may, of course, take place in batch equipment.

The sulfur halides are soluble in many organic solvents and among these the halogenated hydrocarbon solvents, such as alkyl halides, ethylene dichloride, chloroform, carbon tetrachloride and the like are the best, but solvent naphtha and various aromatic solvents such as benzene, toluol and xylol may be used since they are substantially inert under the conditions employed here. These solvents are relatively low boiling, chloroform, for example, boiling at 61.5° C., carbon tetrachloride boiling at about 76° C., benzene at about 80° C., and toluol at about 111° C.

It is preferable to employ the same solvent for dissolving the separate reactants although, of course, this is not necessary but it is preferable since solvent recovery is greatly simplified in this way. The equipment should be constructed of materials which are not corroded by the sulfur halides, for example, glass lined equipment may be used, or it may be constructed of nickel or lined with such metals.

The sulfur halides and the phenolic materials are supplied in proportions of from 1.25 to 1.75 and preferably 1½ parts of the halide to 2 parts of the phenolic material and the temperature is kept well below the boiling temperature of the solvent, preferably below 50° C. Various phenolic materials may be used and for the making of petroleum additives the alkyl groups should be preferably of more than four carbon atoms; for example, amyl phenol, octyl, dodecyl phenols are all easily prepared very satisfactorily by this means.

When suitable metal oxides are caused to react with them, the sulfurized metal phenates produced are highly satisfactory because of their excellent properties as well as their insensitivity.

Example

A 36% by weight solution of a tertiary octyl phenol in chloroform and a 26% solution of sulfur dichloride in the same solvent were separately fed to a vessel containing chloroform. The vessels were agitated with a stirrer and the solutions of halide and phenol were concurrently added in stoichiometric amounts so that 1.5 mols of sulfur chloride were added in proportion to 2 mols of the phenol. A slight vacuum was held on the reaction vessel for the removal of hydrochloric acid along with a small amount of solvent. The temperature was maintained at about 30° C. throughout. After both solutions had been added, the total mixture contained 17% by weight of sulfurized tertiary octyl phenol. The material was stirred thoroughly until all of the hydrochloric acid was removed and about one-half the solvent was then removed by vacuum stripping. Lubricating oil, SAE-20 grade, and stearyl alcohol were then added in proportions as will be apparent below, and the remainder of the solvent was removed. The resulting mixture contained 33.9% of the phenolic sulfide, 6.6% stearyl alcohol, and 59.5% lubricating oil. This mixture was heated to 115–120° C. and mixed with 20% excess of the stoichiometric amount of barium hydroxide containing 8 mols of water commonly known as barium octahydrate to neutralize the phenol. Filter aid was added and the mixture was filtered at 150° C. The final product then contained 40% by weight of the metal salt of the alkyl phenol sulfide, 6% by weight of stearyl alcohol and 54% by weight of lubricating oil.

The water sensitivity of the material was then tested by first blending it with a lubricating oil so as to contain 2.5% of the added concentrate, that is to say 1% of the additive per se with 1% by weight of water, for a period of 15 minutes using a motor driven egg beater type of mixer, specifically the one known as the "Mixmaster," operated at maximum speed. After stirring, the emulsified mixture was poured into a 500 graduate and allowed to stand for 24 hours. At the end of this period, the amount of emulsion layer separated from the oil was recorded and expressed as cc. of emulsion per 500 cc. sample. The smaller the amount of separation, the better are the water resistant qualities of the additive.

In three successive tests with the above mentioned additive, the water sensitivity is recorded as 3, 2 and 4 cc. respectively, giving an average of 3. For comparison it may be stated that similar material prepared in a commercial plant with no care to provide proper ratios of sulfur halide and phenol, as disclosed herein, gave products of widely varying sensitivity, averaging 60, and over a two month period and with spot samples, from 10 cc. to 200 cc.

We claim:

1. An improved process for producing phenolic sulfides and disulfides which comprises admixing phenolic material and the sulfur halide, holding the temperature of the mixture down by cooling so that it does not rise substantially above 50° C. and maintaining the ratio of phenolic material and sulfur halide within the limits of 1.25 to 1.75 mol of the halide to 2 of the phenolic material throughout the reaction period, and removing hydrochloric acid as a vapor.

2. An improved process for producing phenolic sulfides and disulfides which comprises mixing the phenolic material and the sulfur halides and maintaining the reactants in proportion of from 1.25 to 1.75 mols of the halide to 2 mols of the phenolic material during the entire reaction period while cooling to prevent the temperature of the reaction mixture from rising substantially above 50° C. and while removing the hydrochloric acid vapors from the product.

3. An improved process for producing phenolic sulfides and disulfides which comprises passing solutions of alkylated phenolic material and a sulfur halide in an inert solvent through a mixing zone while maintained at a temperature below 50° C. and thence to an enlarged zone, continuously providing a fixed ratio of approximately 1.5 mols of halide to 2 of the phenolic material throughout the reaction period, withdrawing hydrochloric acid vapors therefrom and withdrawing a solution of the product.

4. An improved process for producing diisobutyl phenol sulfide and disulfide which comprises separately dissolving tertiary octyl phenol in an inert solvent, dissolving a sulfur halide in another portion of the same solvent, passing the two dissolved ingredients continuously into an enlarged zone while maintaining the molal ratio of approximately .75 between the halide and phenolic material and the temperature below 50° C., withdrawing vaporized hydrochloric acid vapors therefrom and continuously withdrawing the product from the enlarged zone.

5. An improved process for producing phenolic sulfides and disulfides which comprises admixing solutions of a phenolic material and sulfur halide while cooling to a temperature below 50° C., maintaining a ratio of 1.25 to 1.75 mols of the halide to 2 of the phenolic material throughout the reaction period, removing hyrdochloride acid vapors and withdrawing the product.

6. Process according to claim 5 in which the hydrochloride acid vapors are continuously removed.

THEODORE J. PETERS, Jr.
JAMES E. J. KANE.

REFERENCES CITED

The following references are of record in the file of this patent:

UNITED STATES PATENTS

| Number | Name | Date |
| --- | --- | --- |
| 2,370,756 | Sibley | Mar. 6, 1945 |
| 2,259,861 | Richardson | Oct. 21, 1941 |
| 2,270,183 | Cook | Jan. 13, 1942 |
| 2,346,826 | Cook | April 18, 1944 |
| 1,756,817 | Ellis | Apr. 29, 1930 |
| 2,139,321 | Mikeska | Dec. 6, 1938 |